(No Model.) 4 Sheets—Sheet 1.

F. H. RICHARDS.
WEIGHING MACHINE.

No. 565,224. Patented Aug. 4, 1896.

Witnesses:
R. W. Pittman
Fred. J. Dole.

Inventor:
F. H. Richards.

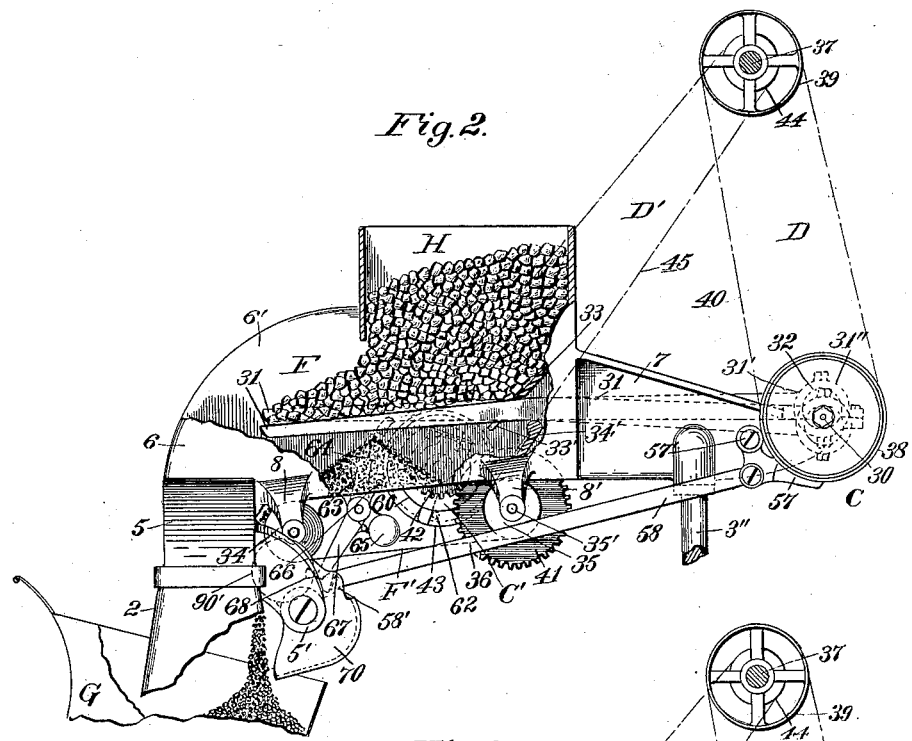

(No Model.) 4 Sheets—Sheet 3.

F. H. RICHARDS.
WEIGHING MACHINE.

No. 565,224. Patented Aug. 4, 1896.

Witnesses:
R. W. Pittman
Fred. J. Dole.

Inventor:
F. H. Richards.

(No Model.) 4 Sheets—Sheet 4.
F. H. RICHARDS.
WEIGHING MACHINE.
No. 565,224. Patented Aug. 4, 1896.
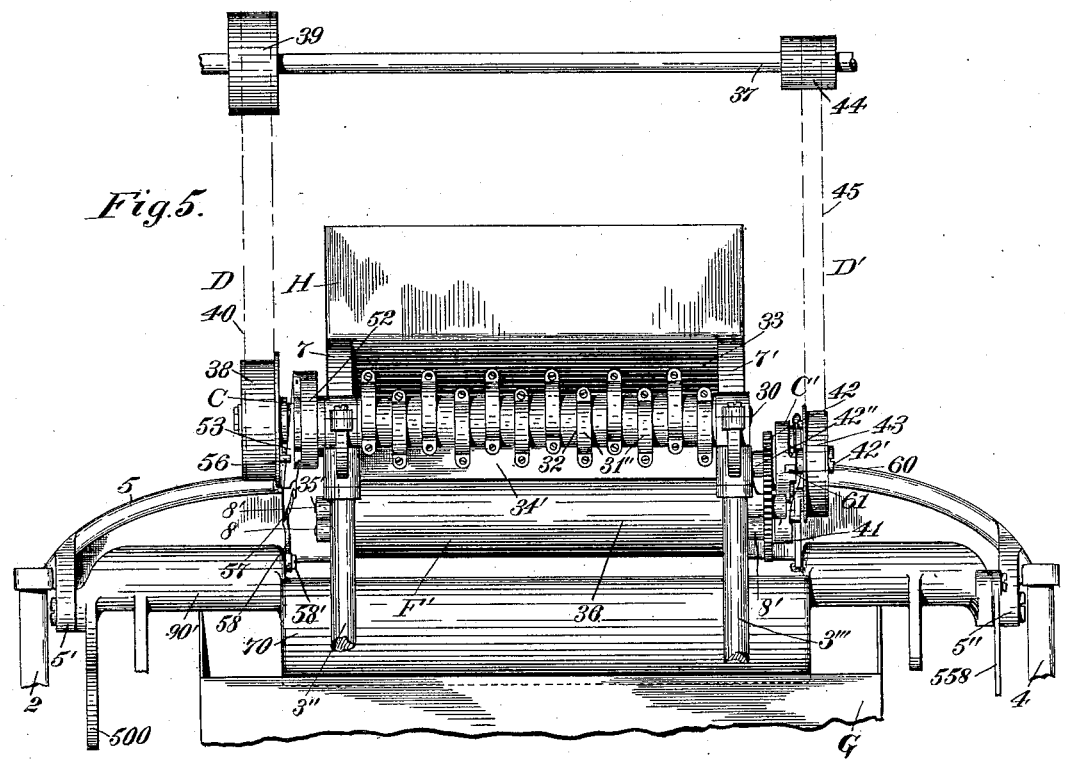
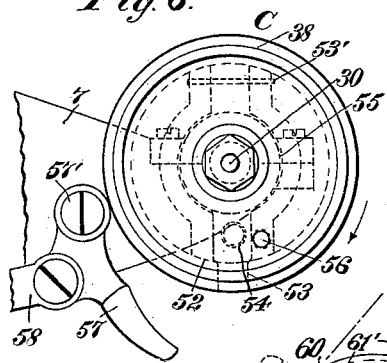
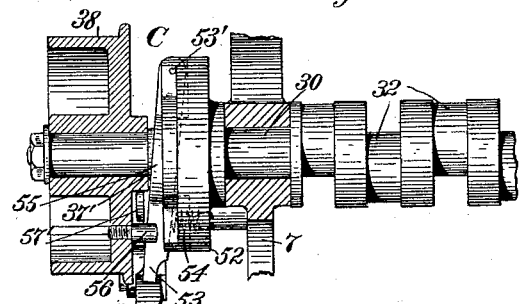
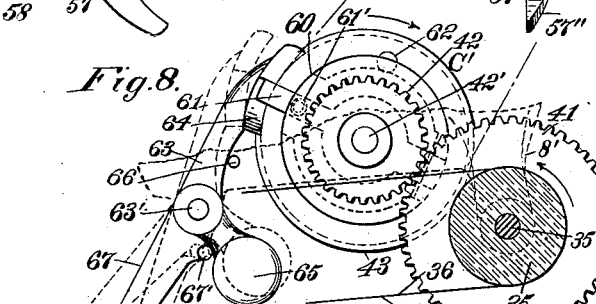
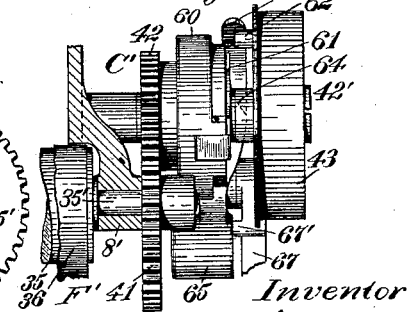
Witnesses:
R. W. Pittman
Fred. J. Dole.
Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 565,224, dated August 4, 1896.

Application filed February 26, 1896. Serial No. 580,806. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatuses which are more especially adapted for weighing lumpy and sluggish materials, such as coal, ore, and the like.

The apparatus embodies as a part thereof a suitable weighing mechanism; and one of the objects of the invention is to secure a steady unbroken supply of the material to be weighed to the bucket of said mechanism.

With this object in view the apparatus, in the preferred form thereof herein illustrated, embodies, in connection with said weighing mechanism, a pair of alternately-operable power-driven feeders, the movements of which may be automatically controlled from and by said weighing mechanism at predetermined points in the operation thereof, the functions of said feeders being to supply said bucket with streams of material composed, respectively, of the coarse and the fine particles of the supply.

Figure 1:
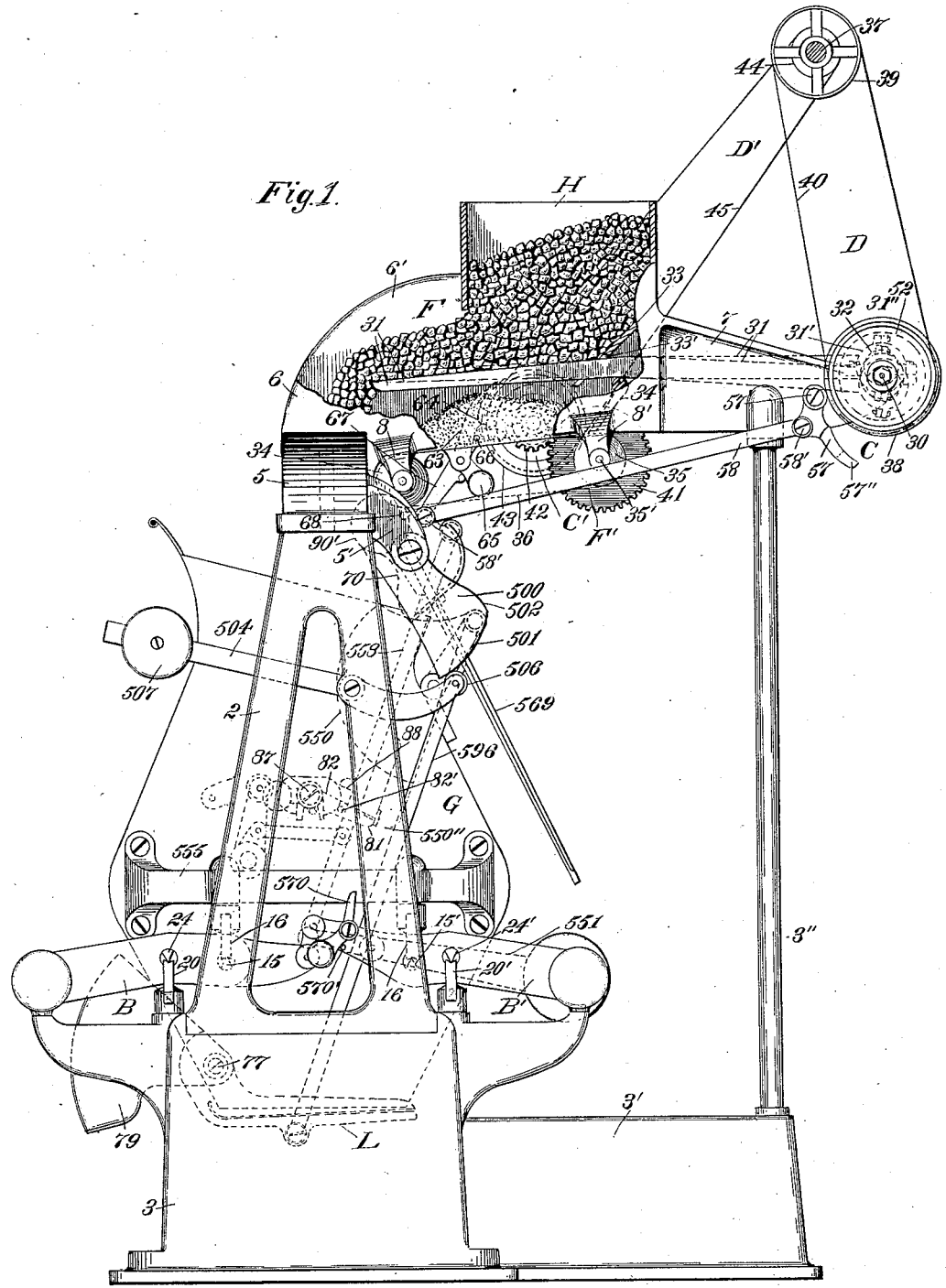
Figure 4:
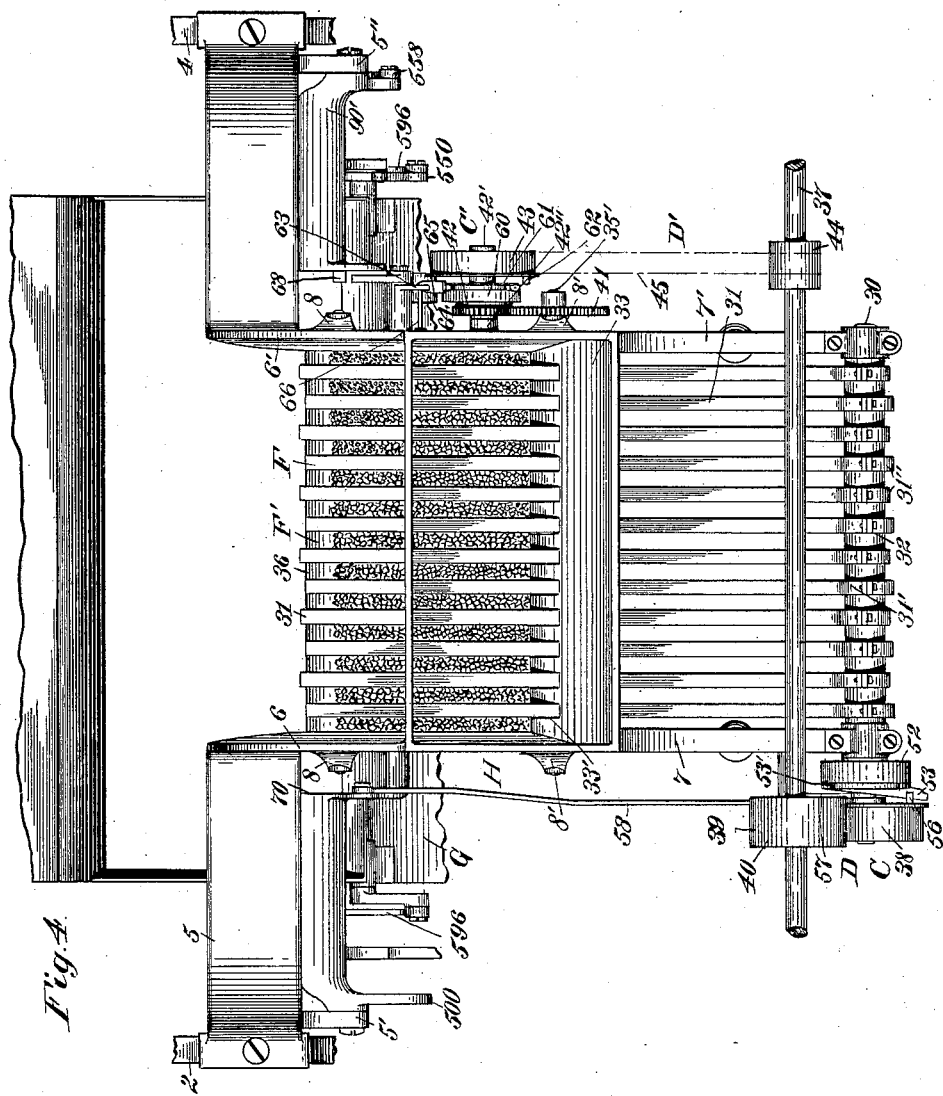

In the drawings accompanying and forming part of this specification, Figure 1 is a left-hand end elevation of my improved weighing apparatus, parts being broken away to better illustrate certain of the operative mechanisms thereof, the main feeder being in motion and the supplemental feeder at rest. Figs. 2 and 3 are left-hand end elevations of the upper portion of the apparatus and illustrate two succeeding steps in the operation of said apparatus. Fig. 4 is a plan view, only a part of the bucket of the weighing-machine being illustrated. Fig. 5 is a rear elevation of the apparatus. Fig. 6 is a detail view, in left-hand end elevation, of part of the main-feeder-controlling means. Fig. 7 is a rear elevation of the same. Fig. 8 is an inside face view in detail illustrating supplemental-feeder-controlling means. Fig. 9 is a plan view of the same.

The improved weighing apparatus embodies as one of the constituent elements thereof a weighing mechanism or machine which may be of any suitable construction; but for convenience in illustrating the nature and purpose of said apparatus I have illustrated (see Fig. 1) and will hereinafter briefly describe the improved weighing mechanism or machine shown and described in Letters Patent No. 548,840, granted to me October 29, 1895, to which reference may be had.

The framework for carrying the operative parts of the weighing-machine is illustrated comprising two side frames or uprights 2 and 4, mounted upon a chambered supporting-base 3 and connected by a top plate 5, the latter also constituting means for supporting certain of the operative mechanisms of the apparatus.

The base 3 is illustrated carrying beam-supports in the form of V-shaped bearings 20 and 20'. In practice these are four in number, but two being shown. These beam-supports support the beam mechanism, which is shown consisting of the oppositely-disposed counterweighted scale-beams B and B', the arms of said scale-beams carrying pivots or knife-edges 24 and 24', which correspond in number with the beam-supports 20 and 20' and are pivotally supported by the latter. The beam-arms of the scale-beam, intermediate of the beam-supports, carry bucket-supports, two of which are illustrated at 15 and 15' as pivots or knife-edges; and the bucket carries hangers on each end thereof, one of which is illustrated at 555, which is provided with V-shaped bearings 16, corresponding in number and position with the pivots or knife-edges 15 and 15', carried by the beam mechanism, and are pivotally supported thereby.

The weighing mechanism embodies the usual poising and counterpoising mechanisms. All that part of the beam mechanism located outside of the beam-supports constitutes the counterpoising mechanism, and all that part of the beam mechanism intermediate of said beam-supports, including the bucket mechanism, which is supported by the beam mechanism for ascending and descending movements, constitutes the poising mechanism of said weighing-machine.

The bucket-closer, which is designated in a general way by L, is shown as having a counterweighted arm 79, preferably formed integral therewith, the closer being also illustrated as pivoted at 77 to the lower side of the bucket G and adjacent to one side of the discharge-opening thereof. As a means for supporting the bucket-closer L, (see dotted lines, Fig. 1,) an inverted toggle is illustrated comprising the rocker 550, pivotally carried by the bucket, and having a long connecting-rod 596 pivotally connected with said rocker and with the bucket-closer L in such a manner that when the closer L is shut the two pivots of said connecting-rod or toggle member will be nearly in line with, and the upper of said pivots will be above, the rocker-pivot, whereby when the rocker is engaged by the bucket-closer latch and held in that position the closer will be supported with a minimum pressure on the latch, as practically all of the weight of the bucket contents will be carried on the pivot of the rocker 550. The closer-latch for locking the rocker in position when the closer is shut, and which is shown at 82 pivoted at 87 on one end of the bucket G, is also shown having a detent or stop 81 in position for engaging the coöperating stop on the toggle connection when the parts are in the closed position previously described. The bucket-closer latch is shown counterweighted, and is limited in its movement toward the stop on the toggle connection by suitable stops. In the embodiment illustrated the closer-latch swings upwardly to engage the stop 550'' on the rocker, and may be released from engagement therewith by a downward pressure.

In weighing granular materials and in a successfully-operating weighing-machine it is necessary to provide for a reduced or drip stream, which flows into the bucket for a limited period of time succeeding the cut off of the main stream. In the ordinary types of weighing-machines it is impracticable to secure a satisfactory drip-stream when weighing certain classes of materials—for example, coal and other lumpy materials—owing to the failure of the drip-stream to properly flow through the reduced opening in the supply chute or hopper, so reduced by the stream-controlling valve or valves employed, thereby causing a blocking or choking of the mass in said chute or hopper, and consequently seriously interfering with the operation of the machine. It is therefore one of the aims of my present invention to overcome such and similar obstacles by the provision of a pair of alternately-operable power-driven feeders, which constitute, respectively, a main feeder, which is designated in a general way by F, and a supplemental or drip-stream feeder, which is designated in a general way by F'. The main feeder is also in the nature of a screen or riddle, and hence constitutes a combined feeder and screen, and will be hereinafter indiscriminately referred to as a "feeder" or "screen." The function of the said member F is to feed the main stream composed of the larger lumps of the supply into the bucket of the weighing-machine and also to separate from the mass the smaller lumps or particles which are to constitute the drip-stream, which latter drop or gravitate onto a suitable device—such as the supplemental or drip-stream feeder F'—the latter feeding such particles into the bucket for completing the partial bucket-load therein.

At the commencement of operation of the apparatus the main feeder or screen F will be in motion, so that the main stream may be fed or forced into the bucket, and during this operation the supplemental feeder F' will be at rest, affording a depository for the finer particles which are separated from the supply by said feeder or screen F on the reciprocation thereof. At the commencement of the poising period, the bucket having descended nearly to the poising-line, the bucket-load being also nearly completed, the bucket contents will be composed of relatively large lumps of practically a uniform size. At this point in the operation of the apparatus suitable means or mechanism (to be hereinafter described) will be brought into play for simultaneously stopping or throwing the main feeder out of action, and consequently stopping the feed or forced main stream of material, and for starting the supplemental or drip feeder for feeding the drip-steam into the bucket. On the movement of the supplemental or drip-stream feeder the drip-stream, composed of the finer particles of the supply, will be fed into the bucket for a limited period of time, these fine lumps, constituting but a small percentage of the bucket contents, forming a thin layer at the top thereof. At the close of the poising period, or when the bucket has descended below the poising-line, the bucket-load having been completed, the supplemental or drip-stream feeder will be instantly stopped, thereby also stopping the drip-stream, following which the bucket-load will be discharged.

The top plate 5 is illustrated carrying the rearwardly-extending plates 6 and 6', which, in turn, carry the supply device or hopper H for containing the mass of material to be weighed, and which, in practice, may be supplied thereto by elevator apparatus or other suitable means. (Not shown.)

The feeder or screen F has a movement in two different planes—a vertical plane and a horizontal plane. On the first-mentioned movement of the feeder the mass supported thereby will be thoroughly loosened up throughout its entire area, so that the finer particles or portions may be readily sifted by said feeder or screen F and drop on to the supplemental feeder F', and on the horizontal movement of said feeder the non-separated portions will be pushed or fed forwardly over the discharge edge of said feeder F and will gravitate into the bucket G.

The supply device or hopper H is illustrated provided with the rearwardly-extending brackets 7 and 7' for supporting the feeder-shaft 30, illustrated journaled in openings formed in said brackets.

The rearward extension 3' of the base 3 of the weighing-machine is illustrated carrying uprights or rods 3'' and 3''', which support said plates 7 and 7' at the rear thereof and constitute an additional means for supporting certain of the operative mechanisms of the apparatus.

The feeder F is illustrated supported for reciprocatory movement and consisting of a series of bars 31, which are alternately set and which are carried by the alternately-disposed eccentrics 32, (see Fig. 7,) formed on the feeder-supporting shaft 30. By reason of this peculiar disposition of the bars 31 of the feeder or screen F a relatively wide space between said bars on the reciprocatory movement of the feeder is insured, to thereby better facilitate the separation of the finer lumps or portions from the supply.

There is illustrated, projecting downwardly from the inside face of the rear wall of the supply-hopper H, an inclined plate 33, which is shown having formed in the lower edge a series of slots 33', constituting guide-slots, between the walls of which the bars 31 of the feeder F may reciprocate, said walls preventing lateral movement of said bars. A second inclined plate is illustrated at 34', extending from the plates 6 and 6', carried by the top plates 5 of the weighing-machine, and which constitutes a bearing for supporting the bars 31 intermediate of their lengths, the upper edge of said plate being rounded off to better adapt it for this purpose. Said last-mentioned plate also serves as a means for preventing waste of the material after its separation from the mass, directing the separated material on to the supplemental feeder F'.

The supporting-shaft 30 for the main feeder F is illustrated provided with a series of alternately-disposed eccentrics 32, and the bars 31, composing the feeder, are shown provided at one of the ends thereof with the semiannular portions 31', which embrace said eccentrics, a second set of semiannular portions being illustrated at 31'', also embracing said eccentrics and secured to said first-mentioned portions.

It will be evident that on the rotation of the feeder-supporting shaft 30 the feeder F will be reciprocated in the manner hereinbefore described by virtue of the eccentrics 32, so that said feeder may simultaneously feed the main stream into the bucket and separate from the mass the finer particles or portions which drop on to the supplemental feeder F'.

The plates 6 and 6' are illustrated carrying brackets or hangers 8 and 8', in which are shown journaled for rotative movement the shafts of the supplemental-feeder supporting-rolls 34 and 35, said rolls being illustrated operatively connected by the belt 36, which may be of canvas, leather, or other suitable material, and which constitutes the supplemental feeder. The two feeders are operatively connected with suitable actuating mechanism, and I have illustrated at 37 a line-shaft constituting a part of the feeder-actuating mechanism and which is operatively connected with the two feeders by means to be hereinafter described, and with a suitable motor. (Not shown.)

The driving mechanism for the main feeder is designated in a general way by D, and the driving mechanism for the supplemental feeder is designated in a general way by D', and these mechanisms will now be described. The shaft 30 of the main feeder F is illustrated carrying at one end thereof the pulley or belt-wheel 38, which is operatively connected with the line-shaft 37, a belt 40 being illustrated passed around the pulley or belt-wheel 39, fixedly carried by said shaft 37, and hence rotative therewith, and the pulley 38. This pulley 38 may be thrown into or out of operative relation with the feeder-supporting shaft 30 for either starting or stopping the main feeder F. The shaft 30 is illustrated shouldered at 37', the purpose of said shoulder being to limit the inward movement of the pulley 38.

The shaft 35' of the rear roll of the supplemental feeder F' is illustrated carrying the relatively large gear 41, which constitutes a driven gear and which meshes with and is driven by the pinion 42, carried by the shaft 42', which latter is supported by the bracket 42'' of the plate 6'. The shaft 42 is also illustrated loosely carrying the pulley or belt-wheel 43, which is operatively connected with the pulley or band-wheel 44, a belt 45 being illustrated operatively connected with these two members. The pulley 43 may also be thrown into or out of operative relation with its shaft 42' for either starting the feeder through the interposed gears 42 and 41 or for stopping the same.

It will be observed that the driven pulley 43 is relatively larger than the pulley 44 and that the gear 42 is much smaller than the driven gear 41, so that when said pulley 43 is in operative relation with the shaft 42' the feeder F' will have a relatively slow movement.

The feeder-movement-controlling means is operatively connected with the weighing-machine and with some reciprocatory member thereof, and I have illustrated the valve 70 as constituting such member. The valve 70 is of the "pan-valve" type and is normally inoperative as such, being located at one side of the line of flow of the two streams to thereby permit the obstructionless descent of the latter into the bucket G after these leave the two feeders F and F'. The valve is illustrated pivoted for oscillatory movement between the brackets or arms 5' and 5'', depending from the top plate 5 of the weighing-machine. At the commencement of operation of the machine said valve 70 will be located some distance from the line of flow of the two streams and to the rear thereof, and as the bucket descends the valve will be slowly moved toward said line, so that at the commencement of the poising period the valve will be adjacent to said line, at which point in the operation of the apparatus said valve is momentarily held to permit the feed of the drip-stream into the bucket. At the close of the poising period, the valve 70 being released, the valve-actuating mechanism quickly projects the same across the line of flow of the two streams, whereby it will catch the drizzle or spray that usually drops from the two feeders when stopped, so that such drizzle or spray is prevented from falling into the loaded bucket.

The valve 70 is illustrated provided with a balance-weight 90', projecting laterally from the opposite end walls thereof, which tends to maintain the same in its operative position, as indicated in Fig. 3, so that said valve has in itself no tendency to move either in a forward or a backward direction.

As a means for moving the valve toward the line of flow of the main and the drip streams, also termed the "closing movement," I prefer to employ the improved valve-actuating mechanism disclosed in Letters Patent No. 548,843, granted to me October 29, 1895, which is illustrated, and which will now be briefly described. A cam is shown at 500 depending from the valve 70 and oscillatory therewith and having two connected cam-faces 501 and 502, the latter being of relatively greater power or efficiency than the former. These cam-faces are in position to be engaged by a valve-closing actuator, so that during the major period of operation of the apparatus a valve-closing actuator engaging the cam-face 501 will move the valve 70 slowly toward the line of flow of the main and drip stream. At the commencement of the poising period the actuator will be approximately at the intersection of the two cam-faces 501 and 502, and the valve will be momentarily held against further movement. On the release of the valve, the bucket-load having been completed, the valve-closing actuator will engage the cam-face 502, whereby the valve will be quickly closed and, the discharge edge thereof intersecting the line of flow of the two streams, will, of course, catch any of the drizzle that may drop from the feeders F and F'.

A valve-closing actuator is illustrated at 504, consisting of a counterweighted lever pivoted to the side frame 2 of the machine and having an antifriction-roll 506 in position for engaging the cam-faces 501 and 502 of the cam 500, to thereby close the valve, the weight 507 of said actuator 504 being adjustable along the forward arm of said lever 504.

As a means for opening the valve the valve-actuating mechanism illustrated, and which is shown and described in Letters Patent No. 548,839, granted to me October 29, 1895, will preferably be employed.

The scale-beam B is illustrated pivotally carrying a supplemental counterpoise 551, which normally forms a part of the counterpoising mechanism of the weighing-machine, but which is shiftable therefrom and on to the poising mechanism thereof, said counterpoise constituting a valve-opening actuator.

The valve 70 is illustrated having a connecting-rod 558 depending therefrom and having the lower end thereof in position to be engaged by the valve-opening actuator 551, so that on the return stroke of said actuator 551 to its normal position it is effective for engaging the lower end of the rod 558 and imparting an upward thrust thereto for opening the valve, to again permit the descent of the two streams into the bucket on the succeeding operation of the apparatus.

The driving mechanism D for the main feeder F embodies a clutch, which is designated in a general way by C, and which may be intermittently rendered operative or inoperative, for either starting or stopping the main feeder F.

The shaft 30 is illustrated carrying a clutch-carrier 52, which may be secured thereto in some well-known manner for rotation therewith, and which is provided with the spring-actuated clutch member 53, pivotally secured at 53' to said member 52, a coiled spring 54 (see dotted lines, Fig 7) being provided for forcing said clutch member 53 outwardly, its normal position, where it may be engaged by a coacting clutch member.

The spring-actuated clutch member 53 is provided with an annular portion 55 of relatively larger diameter than the shaft 30, which extends about the same, so that as said member 53 is moved toward and from its normal position the inner face of said annular portion will not touch the periphery of the shaft 30. The inner face of said clutch member 52 is provided with a suitable recess for receiving the member 53, when this is forced from its normal position. The normal position of the clutch member 53 is illustrated in Fig. 7.

It will be remembered that the power-shaft 30 of the main feeder F is illustrated carrying a loose pulley 38, the direction of movement of which is indicated by the arrow in Fig. 6. This loose pulley 38 is shown having projecting from the inner face thereof the clutch member 56 in the form of a pin or dog screwed into said face. On the rotation of the pulley in the direction indicated, the spring-pressed clutch member 53 being in its normal position, the pin or dog will engage said clutch member 53, so that on the continued rotation of said pulley 38 the clutch-carrier 52, and hence the feeder-shaft 30, will be rotated so long as these members 56 and 53 are in engagement, whereby the feeder may be reciprocated for simultaneously feeding portions of the mass into the bucket and sifting the finer particles therefrom, so that they may drop on to the supplemental feeder F'.

A clutch-actuator is illustrated at 57 in the form of a lever pivoted at 57' to the framework of the apparatus and as having a wedge portion 57''. This wedge-shaped portion 57'' has a movement between the inner faces of the loose pulley 38 and the clutch member 53, so that it is effective for forcing the latter inwardly and away from the pin or dog 56, carried by the pulley 38, until said member 53 has been forced into a recess or seat therefor formed in the face of the clutch-carrier 52 and flush, or approximately flush, with said face, so that on the rotation of the pulley the pin 56 carried thereby cannot engage the clutch member 53, the result being a stoppage of the main feeder F and also of the stream fed thereby into the bucket G.

The clutch-actuator 57 is illustrated connected with the valve by the connecting-rod 58, which is illustrated pivoted to said valve at 58' at a point adjacent to the center of movement thereof and to the actuator 57 below its pivot. As the valve 70 closes the valve end of the connecting-rod 58 will describe an arc about the valve center, whereby said connecting-rod will be slowly moved rearwardly, and the clutch-actuator, operated by said connecting-rod 58, will be upwardly oscillated about its pivot, so that the wedge-shaped portion 57'' of said actuator will be thrust between the inner face of the pulley 38 and the spring-actuated clutch member 53 of the clutch C, and, engaging said clutch member 53, will force the same away from its normal position by disengaging it from the pin 56, carried by the pulley 38, so that when said member 53 has been disengaged from said pin, or is out of the plane of movement thereof, the pulley, though continuing to rotate about the shaft 30, will be ineffective for transmitting movement, hence stopping the main feeder F. It will be apparent that on the opening movement of the valve 70 this operation will be reversed, whereby the feeder F may be again restored to action, said valve constituting a means for throwing the feeder into and out of action through operative connections therewith.

The shaft 42' of the supplemental feeder F', as hereinbefore stated, is illustrated loosely carrying the pulley or belt-wheel 43, and there is also illustrated, loosely carried by said shaft for rotative movement thereon, a clutch-member carrier 60 of a clutch, which latter is designated in a general way by C', and which constitutes part of the supplemental-feeder-driving mechanism D'. This clutch-member carrier 60 pivotally carries the spring-actuated clutch member 61, a spring 61' (see dotted lines, Fig. 8) being employed for this purpose. The member 61 being similar in construction to the member 52 of the clutch C, it is not deemed necessary to describe the former in detail. The spring-pressed member 61 is also in position to be engaged by a coöperating clutch member 62, whereby when these members are in engagement the pulley 43, on the rotation thereof in the direction of the arrow indicated in Fig. 8, will rotate the pinion 42, and hence the supplemental feeder F', through the interposed gearing 41, will be thereby driven. In the normal position thereof the clutch member 61 is free of the pin 62, carried by the pulley 44, a device constituting a feeder-movement limiter and operable for normally limiting the movement of the feeder F' being employed for engaging said spring-pressed clutch member 61 and forcing it away from, or out of the plane of movement of, the coöperating clutch member or pin 62, so that on the rotation of said pulley 43 the latter will be ineffective as a power-transmitting factor, though rotating about the supporting-shaft 42' therefor.

The feeder-movement limiter is illustrated at 63, and, as illustrated, it consists of a counterweighted lever pivotally supported at 63' for oscillatory movement and having above the pivot the wedge-shaped portion 64, which normally engages the spring-pressed clutch member 61 and forces the same away from the coacting clutch member or pin 62 on the pulley, whereby the movement of the feeder will be prevented when the parts are in such position, the counterweight 65 tending to maintain said lever in its normal or operative position. A stop 66, carried by the framing, is also provided for limiting the movement of said lever 63. The lever 63 at a point below the pivot thereof is in position to be engaged by an actuator operated by and from the weighing-machine, so that when said lever is thus engaged and oscillated about its pivot the wedge-shaped portion 64 thereof will be withdrawn from between the spring-pressed member 61 and the inner face of the clutch member 60, so that the said member 61 may be forced outwardly by its spring 61' into a position to be engaged by the pin 62 on the pulley 43, and so that the pulley 43 and the supplemental feeder may be thereby driven, the latter for feeding or forcing the drip-stream into the nearly-loaded bucket G; and it will be apparent that when the movement of this lever 63 is reversed the spring-actuated clutch member 61 will be returned to its normal position and the supplemental feeder F' thereby stopped.

An actuator is illustrated at 67 in position to be operated by the valve 70 at a predetermined point in the closing movement thereof and simultaneously with the stoppage of the main feeder, and to thereby also operate the lever 63, whereby the wedge-shaped portion thereof may be moved from its normal position to the position shown by the dotted lines in Fig. 8, to thereby start the supplemental feeder F'. This actuator is supported for oscillatory movement about the pivot of the lever 63, and is shown provided with a pin 67' for engaging the lower arm of the lever as the valve closes, whereby the operation just described may be effected.

The balance-weight 90' of the valve 70 is illustrated provided with a device 68, which is in position for engaging the lower end of the oscillatory actuator 67, thereby oscillating the same and also operating the feeder-movement limiter, so that said limiter may be thrown into its inoperative position for starting the feeder. On the further closing movement of the valve the device 68 thereof passes from off the lower edge of the actuator 67, and said actuator is released, so that the counterweight 65 of the lever will force the wedge-shaped portion 64 thereof to its normal position for stopping the feeder, and for also returning said actuator 67 to its normal position, where it may be again engaged by said device 68 on the succeeding operation of the apparatus. On the opening movement of the valve the device 68 thereon will engage the lower end of the actuator 67, and, swinging the latter about its pivot, said actuator being in the nature of a by-pass actuator, will be thereby permitted to resume its normal postion. At a predetermined point in the closing movement thereof the valve 70 may be momentarily held, and means, which will be now described and operated by the weighing-machine, are employed to control the duration of movement of the supplemental feeder F', to permit the feeding of the drip-stream into the bucket for completing the bucket-load therein, the main feeder F at this point being at rest.

The valve 70 is illustrated provided with a depending stop-arm 569, which is in position to be engaged by a coöperating stop carried by the poising mechanism of the weighing-machine. Such coöperating stop is illustrated at 570 as a counterweighted by-pass lever supported for oscillation by the scale-beam B' and having the upper or vertical arm thereof in position for engaging said stop-arm 569 approximately at the commencement of the poising period, so that the duration of flow of the drip-stream may be controlled by the weighing-machine. Near the final closing movement of the valve the device 68 operatively engages the actuator 67, and through this, by throwing the limiter 63 to its inoperative position, starts the feeder, so that when said valve is held the drip-stream may be fed into the bucket. On the completion of the bucket-load the stop 570 will release the stop-arm 569 and also the valve 70, whereby the latter may be closed, and during this last-mentioned operation the device 68 will pass from off the actuator 67, whereby it may resume its normal position. On the return movement of the valve 70 the stop-arm 569 engages and swings the by-pass lever 570 about its pivot, so that the valve may resume its open position, and when said stop-arm 569 has passed by the stop 570 the latter drops to its normal position, with the counterweighted arm thereof resting on the stop 570' on the scale-beam B'.

At the close of the poising period it is important to instantly bring about the release of the bucket-closer for discharging the bucket-load, and for effecting this operation I prefer to employ a valve-operated actuator—that is, one operated by and from the power of the closing-valve. Such an actuator is illustrated at 88, carried by the connecting-rod 558, depending from the valve 70, and having a slow descending movement away from the valve on the closure thereof. On the release of the valve 70, in the manner previously described, this actuator 88 is thrust downwardly into engagement with the stop-pin 82' of the latch 82, thereby depressing said latch and disengaging the detents of the latch 80 and the rocker 550, so that, the closer L being free of all restraint, the weight of the bucket contents pressing thereagainst forces the same open for discharging the bucket-load.

The operation of the hereinbefore-described apparatus, briefly described, is as follows: The bucket G being empty and the valve 70 in its open position, as indicated in Fig. 1, and motion being imparted to the pulley 39, carried by shaft 37, the pulley 38 being in operative relation with the main-feeder-supporting shaft 30, said shaft 30 will be rotated. On the rotation of said shaft reciprocatory movement will be imparted to the feeder through the supporting-eccentrics 32 of the bars 31 thereof, so that said feeder simultaneously pushes forward portions of the mass and separates the finer particles therefrom which drop on to the supplemental feeder F', this being, at this point in the operation of the apparatus, at rest. The portions of the mass supported by the main feeder F which are fed forwardly drop over the discharge edge thereof and into the bucket G. When a certain portion of the load has been received by the bucket G, this tends to descend, and during said descending movement the valve 70 is slowly closed, so that the latter is effective for rearwardly thrusting the actuator 57, whereby this unclutches the clutch C for stopping the main feeder. Simultaneously therewith the device 68, carried by the valve 70, will engage and depress the actuator 67, this, in turn, engaging the counterweighted lever 63 and forcing it from its normal position, so that the clutch C' may be clutched to the pulley 43, and so that the supplemental feeder F' may be driven by the pulley 44, carried by the shaft 37, to thereby feed or convey the finer particles of the supply which constitute the drip-stream into the bucket G. At this point the stop-arm 569 of the valve will be engaged by the stop 570 and the valve 70 held against further movement, whereby, by reason of the operative connections with the feeder-movement limiter, it will be effective for permitting the continued movement of said feeder F'. The drip-stream is fed into the bucket for a limited period of time, and when the bucket-load has been completed the bucket descends below the poising-line, this action causing a release of the stop-arm 569, and hence of the valve 70. At this point the valve-actuator 504 will be about at the intersection of the cam-faces 501 and 502, and when the valve is released the antifriction-roll 506, engaging the cam-face 502, quickly projects said valve across the line of flow of the main and drip streams of material, and the device 68, carried by said valve, passing by the actuator 67, the latter and the feeder-movement limiter 63 are returned to the normal positions thereof, so that said limiter may instantly stop the movement of the supplemental feeder F'. During the final closing movement of the valve 70 the connecting-rod 558 is forced downwardly, so that the actuator 88 thereon will be carried into contact with the stop-pin 82' of the bucket-closer latch 82, this action depressing the said latch and releasing the detent thereon from engagement with the detent of the rocker 550, whereby the bucket-closer L is freed of all restraint. The bucket-closer L being thus released, the weight of the bucket contents pressing thereagainst will force the same open for discharging the bucket-load.

Having thus described my invention, what I claim is—

1. In an apparatus of the class specified, the combination with weighing mechanism embodying a scale-beam, and a bucket supported by said beam; of a pair of alternately-operable feeders, one of which is located below the other; and driving mechanism for said feeders.

2. In an apparatus of the class specified, the combination with weighing mechanism embodying beam mechanism, and a bucket supported thereby; of a pair of power-driven feeders; means operable for simultaneously throwing one of said feeders out of action, and the other into action; and a supply device for said feeders.

3. In an apparatus of the class specified, the combination with weighing mechanism embodying beam mechanism, and a bucket supported thereby; of a pair of power-driven feeders; means operable for simultaneously throwing one of said feeders out of action, and the other into action, and having said means operatively connected with said weighing-machine; and a supply device for said feeders.

4. In an apparatus of the class specified, the combination with weighing mechanism embodying a scale-beam, and a bucket supported by said scale-beam; of a combined feeder and screen; driving mechanism for the latter; and means operative with the weighing mechanism for controlling the movement of said combined feeder and screen.

5. In an apparatus of the class specified, the combination with weighing mechanism embodying a scale-beam, and a bucket supported by said scale-beam; of a combined feeder and screen; driving mechanism therefor; a power-driven feeder located below said combined feeder and screen; and means operative with the weighing mechanism for controlling the movement of said combined feeder and screen.

6. In an apparatus of the class specified, the combination with weighing mechanism embodying a scale-beam, and a bucket supported by said scale-beam; of a supply-hopper adapted for containing a mass of material; a screen located to receive the material from said hopper and adapted for separating portions therefrom; a power-driven feeder located below said screen; and means operative with the weighing mechanism for controlling the movement of said feeder.

7. In an apparatus of the class specified, the combination with weighing mechanism embodying beam mechanism, and a bucket supported thereby; of a power-driven feeder consisting of a series of bars supported for reciprocatory movement; and feeder-movement-controlling means operatively connected with said weighing-machine.

8. In an apparatus of the class specified, the combination with weighing mechanism, embodying beam mechanism, and a bucket supported thereby; of a feeder consisting of a series of bars supported for horizontal reciprocatory movement; feeder-actuating mechanism; and feeder-movement-controlling means operatively connected with said weighing-machine.

9. In an apparatus of the class specified, the combination with weighing mechanism embodying beam mechanism, and a bucket supported thereby; of a feeder consisting of a series of bars supported for horizontal and vertical movements; feeder-actuating mechanism; and feeder-movement-controlling means operatively connected with said weighing-machine.

10. In an apparatus of the class specified, the combination with weighing mechanism embodying beam mechanism, and a bucket supported thereby; of a shaft having a series of eccentrics; bars carried by said eccentrics and constituting a feeder; actuating mechanism for said shaft; and feeder-movement-controlling means operatively connected with said weighing-machine.

11. In an apparatus of the class specified, the combination with weighing mechanism embodying beam mechanism, and a bucket supported thereby; of a shaft having a series of alternately-disposed eccentrics; a bar carried by each of said eccentrics, and having said bars constituting a feeder; driving mechanism for said shaft; and feeder-movement-controlling means operatively connected with said weighing-machine.

12. In an apparatus of the class specified, the combination with weighing mechanism embodying beam mechanism, a bucket supported thereby, and a valve; of a pair of feeders; and means operatively connected with said valve for simultaneously throwing one of said feeders into action, and the other out of action.

13. The combination with weighing mechanism, of main and supplemental power-driven feeders; means embodying a detent device for normally maintaining said supplemental feeder at rest; and an actuator operative with said weighing mechanism and operable for throwing said detent device into an inoperative position to thereby start said supplemental feeder.

14. In an apparatus of the class specified, the combination with weighing mechanism embodying beam mechanism, and a bucket supported thereby; of a pair of power-driven feeders; means for simultaneously stopping one and starting the other feeder; and means operative with the weighing-machine for controlling the duration of movement of said last-mentioned feeder.

15. The combination with weighing mechanism embodying a reciprocatory member, of a power-driven feeder; means embodying a detent device for normally maintaining said feeder at rest; and a by-pass actuator operated by said reciprocatory member to throw said detent device into an inoperative position to thereby start said feeder, said actuator having an ineffective return movement.

16. In an apparatus of the class specified, the combination with weighing mechanism embodying beam mechanism, and a bucket supported thereby; of a feeder and its supporting-shaft; a loose pulley carried by said shaft provided with a clutch member; driving mechanism for said pulley; a coöperating clutch member carrying a spring-pressed member in position to be engaged by said first-mentioned clutch member; an actuator operated by said weighing-machine, and adapted to move said spring device away from said first-mentioned clutch member, to thereby start the feeder.

17. In an apparatus of the class specified, the combination with weighing mechanism embodying a reciprocatory member, of a pair of feeders; driving mechanism for said feeders, each embodying a clutch; and clutch-actuators in position to be operated by said reciprocatory member, and operable for simultaneously unclutching one and clutching the other of said clutches, whereby the two feeders will be, respectively, stopped and started.

18. In an apparatus of the class specified, the combination with weighing mechanism embodying beam mechanism, a bucket supported thereby; and a reciprocatory member; of a feeder; driving mechanism embodying a clutch for said feeder; a counterweighted lever normally operative for unclutching said clutch; an actuator in position to be operated by said reciprocatory member, to thereby throw said counterweighted lever into an inoperative position, whereby the feeder will be started.

19. The combination with weighing mechanism embodying a valve, of a power-driven feeder; a device normally operative for maintaining said feeder at rest; an actuator operated by said valve and operable for throwing said device into an inoperative position; a depending stop-arm carried by said valve; and a coöperating stop in position to engage said arm at a predetermined point to also release the same.

20. In an apparatus of the class specified, the combination with weighing mechanism embodying beam mechanism, and a bucket supported thereby; of a hopper adapted for containing a mass of material; a pair of power-driven feeders, each operable for feeding a stream of material into said bucket; means for simultaneously stopping one and starting the other of said feeders; a valve below said feeders, and normally located at one side of the line of flow of the streams of material fed by said feeders into said bucket; and valve-actuating means.

21. In an apparatus of the class specified, the combination with weighing mechanism embodying a reciprocatory member; of a shaft having a series of eccentrics; a bar carried by each of said eccentrics, said bars constituting a feeder; driving mechanism for said feeder, embodying a clutch; and a clutch-actuator in position to be operated by said reciprocatory member.

22. In an apparatus of the class specified, the combination with weighing mechanism embodying a reciprocatory member; of a shaft having a series of eccentrics; a bar carried by each of said eccentrics, and having semiannular portions embracing said eccentrics; complementary semiannular portions also embracing said eccentrics, and connected with said first-mentioned semiannular portions, said series of bars constituting a feeder; driving mechanism for said feeder, embodying a clutch; and a clutch-actuator in position to be operated by said reciprocatory member.

23. In an apparatus of the class specified, the combination with weighing mechanism embodying beam mechanism, and a bucket supported thereby; of a supply-hopper adapted for containing a mass of material; a plate located within said hopper, and having a series of guide-slots therein; a series of bars constituting a feeder, each of which works between one of said slots; feeder-actuating mechanism; and feeder-movement-controlling means operatively connected with said weighing-machine.

24. In an apparatus of the class specified, the combination with weighing mechanism embodying a reciprocatory member; of a power-driven feeder; a clutch comprising part of the feeder-driving mechanism, and embodying two engaging members; a counterweighted lever normally operative for disengaging said members; and an actuator separate from and adapted for operating said counterweighted lever, to throw the same from its normal position and in position to be operated by said reciprocatory member.

25. In an apparatus of the class specified, the combination with weighing mechanism embodying a valve, of a feeder; driving mechanism embodying a clutch for said feeder, said clutch comprising two engaging members; and a device having a wedge-shaped portion operable for engaging one of said members; and in position to be operated by said valve.

26. In an apparatus of the class specified, the combination with weighing mechanism embodying a reciprocatory member, of a pair of feeders; driving mechanism for said feeders, embodying clutches each comprising two engaging members; a device normally operative for disengaging said members of one of the clutches; a clutch-actuator for the other clutch, and having said clutch-actuator and device in position to be simultaneously operated by said reciprocatory member, whereby one of said feeders will be started and the other stopped.

FRANCIS H. RICHARDS.

Witnesses:
FRED. J. DOLE,
EMORY C. WHITNEY.